United States Patent
Cahill

(10) Patent No.: US 6,568,193 B1
(45) Date of Patent: May 27, 2003

(54) METHOD AND APPARATUS FOR COOLING AN ELECTRIC MOTOR

(75) Inventor: Frank E. Cahill, Lenexa, KS (US)

(73) Assignee: Emerson Electric Co., St. Louis, MO (US)

(*) Notice: Subject to any disclaimer, the term of this patent is extended or adjusted under 35 U.S.C. 154(b) by 158 days.

(21) Appl. No.: 09/769,655

(22) Filed: Jan. 25, 2001

(51) Int. Cl.[7] ............................................... F25B 21/02
(52) U.S. Cl. ............................ 62/3.2; 62/331; 310/52
(58) Field of Search ..................... 62/3.3, 3.2, 3.6, 62/331; 310/52

(56) References Cited

U.S. PATENT DOCUMENTS

| | | | | |
|---|---|---|---|---|
| 1,818,437 A | * | 8/1931 | Stuart ............................. | 62/3 |
| 3,386,255 A | * | 6/1968 | Venema ........................... | 62/3 |
| 4,400,948 A | * | 8/1983 | Moorehead ....................... | 62/3 |
| 5,501,076 A | * | 3/1996 | Sharp, III et al. ............... | 62/3.6 |
| 5,628,769 A | * | 5/1997 | Saringer ......................... | 607/98 |
| 5,895,418 A | * | 4/1999 | Saringer ......................... | 607/104 |

OTHER PUBLICATIONS

Marlow Industries, Inc. brochure entitled "In the Region of Ice . . . " (publication date unknown).

Materials Electronic Products Corporation (Melcor) brochure entitled "FRIGICHIP® Miniature Ceramic Modules Series FC" (1985).

Tellurex Corporation Internet publication entitled "An Introduction to Thermoelectrics" (printed from Internet Jan. 14, 1999).

Karen Auguston Field and Bruce Wiebusch, "The Big Chill," *Design News*, pp. 74–78 (Oct. 18, 1999).

* cited by examiner

*Primary Examiner*—Denise L. Esquivel
*Assistant Examiner*—Melvin Jones
(74) *Attorney, Agent, or Firm*—Hovey Williams LLP

(57) ABSTRACT

A method and apparatus for cooling an electric motor is provided. The enclosure is adapted to house the internal components of an electric motor and protect the internal components of the electric motor from an external environment. The enclosure can be the actual shell of an electric motor or a separate housing. A thermoelectric cooling device is disposed between the interior of the enclosure and the external environment. An electric current is delivered to the thermoelectric cooling device to facilitate the transfer of heat from the enclosure interior to the external environment, thereby cooling the enclosure interior.

39 Claims, 6 Drawing Sheets

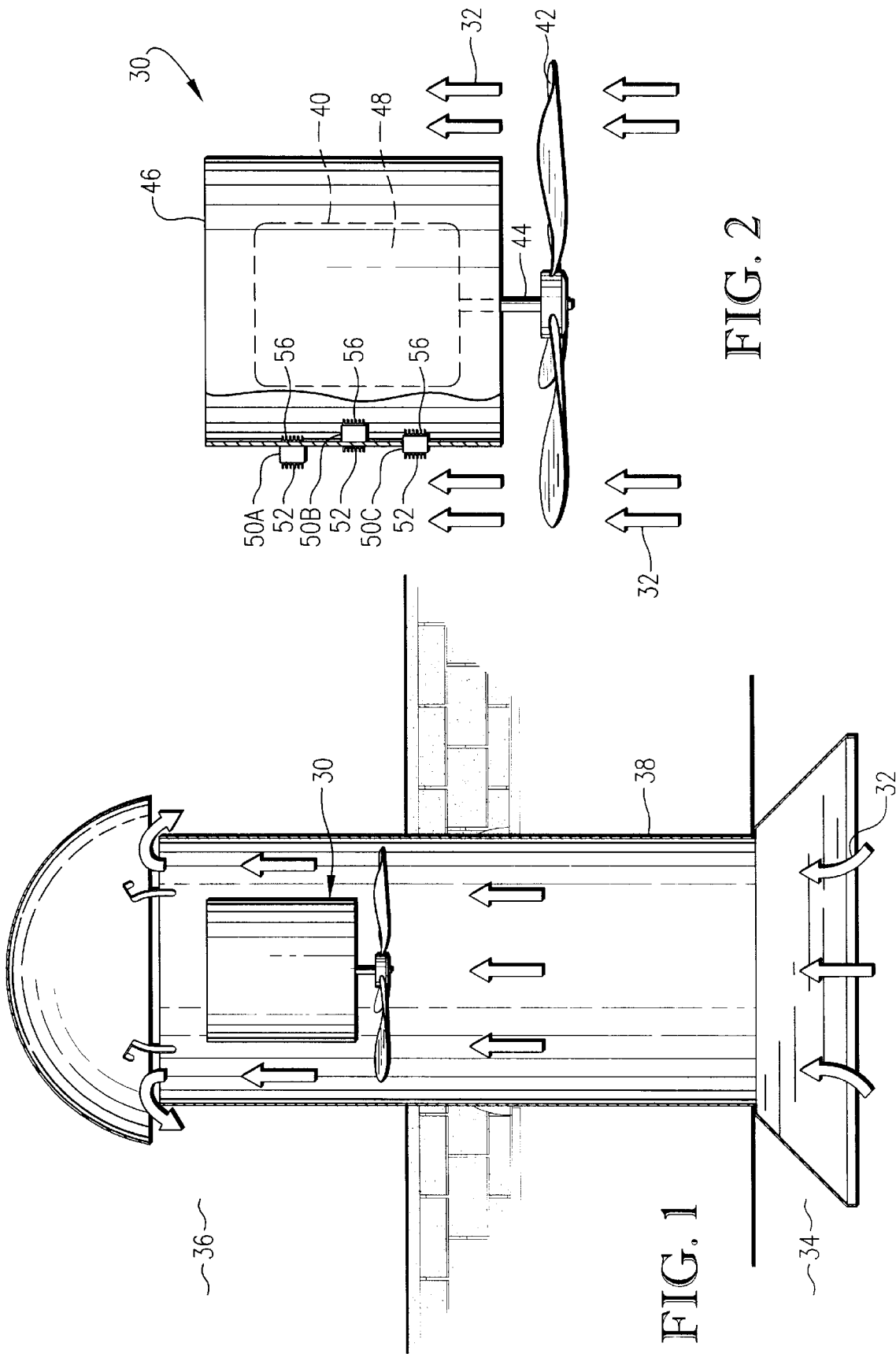

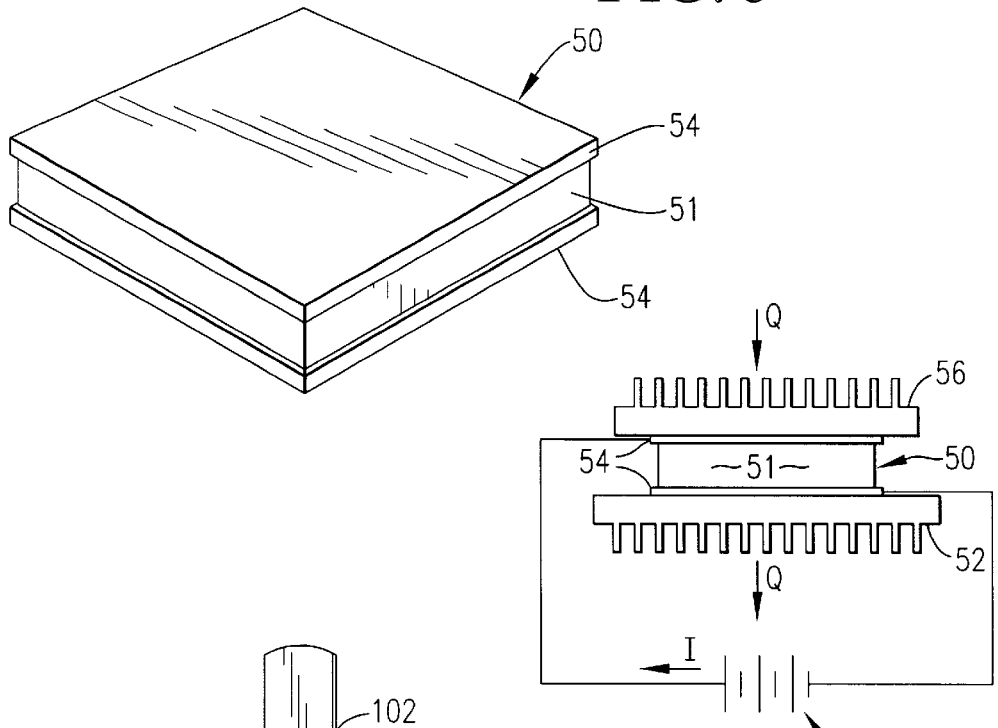
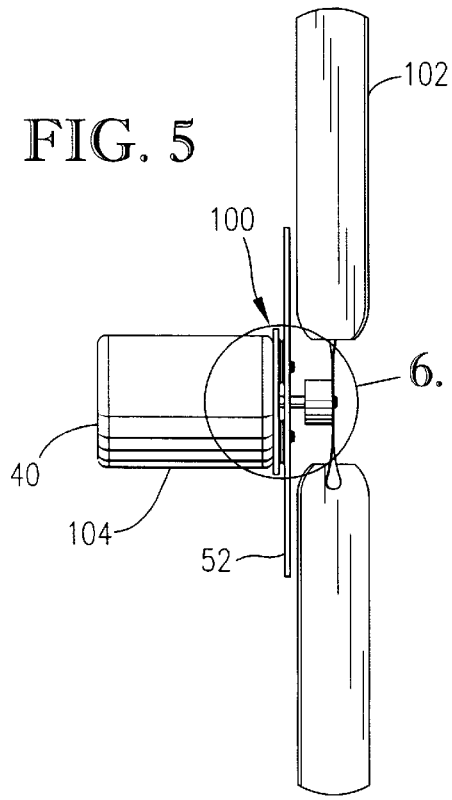
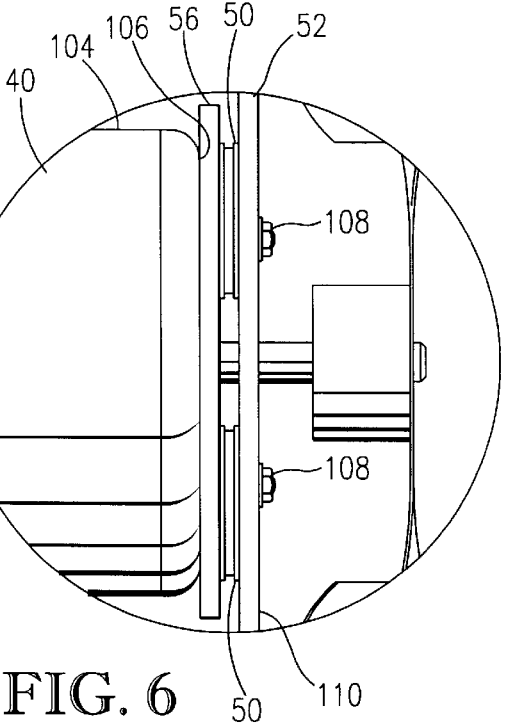

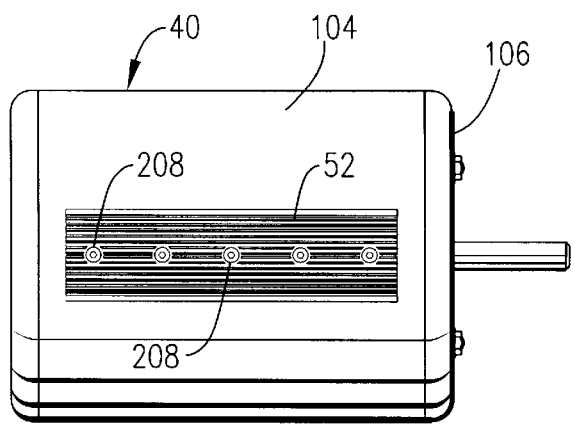
FIG. 10
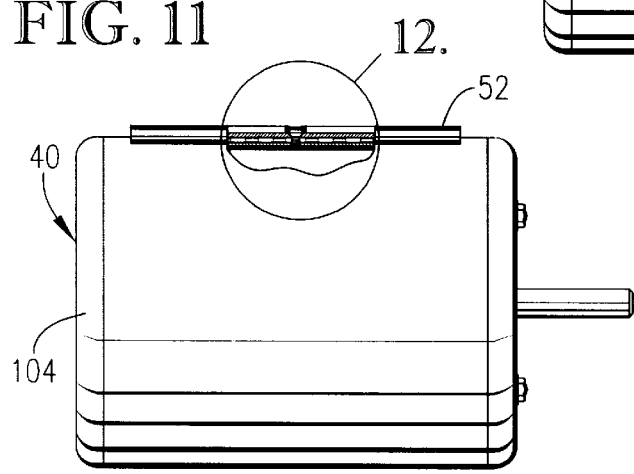
FIG. 11
FIG. 12
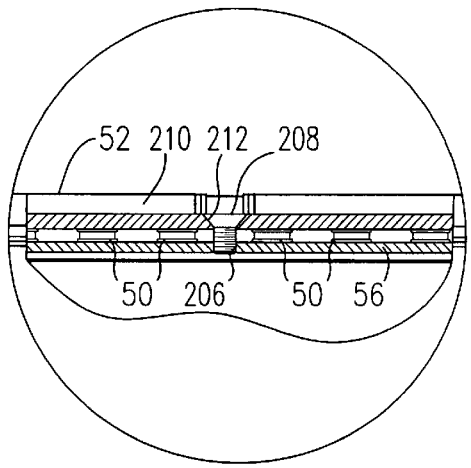
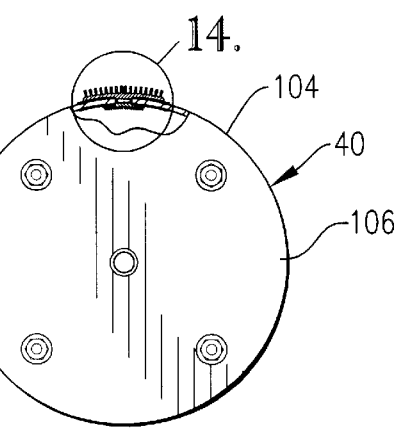
FIG. 13
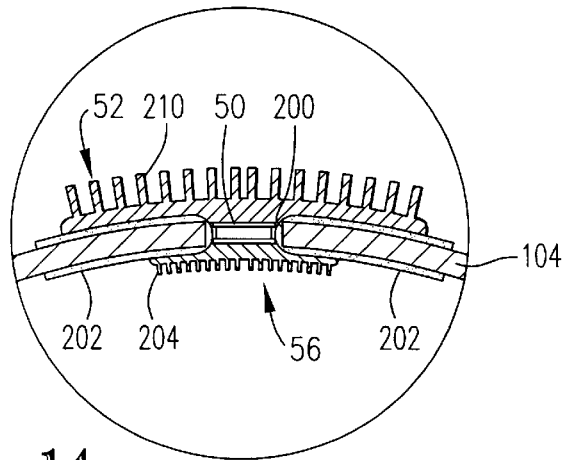
FIG. 14

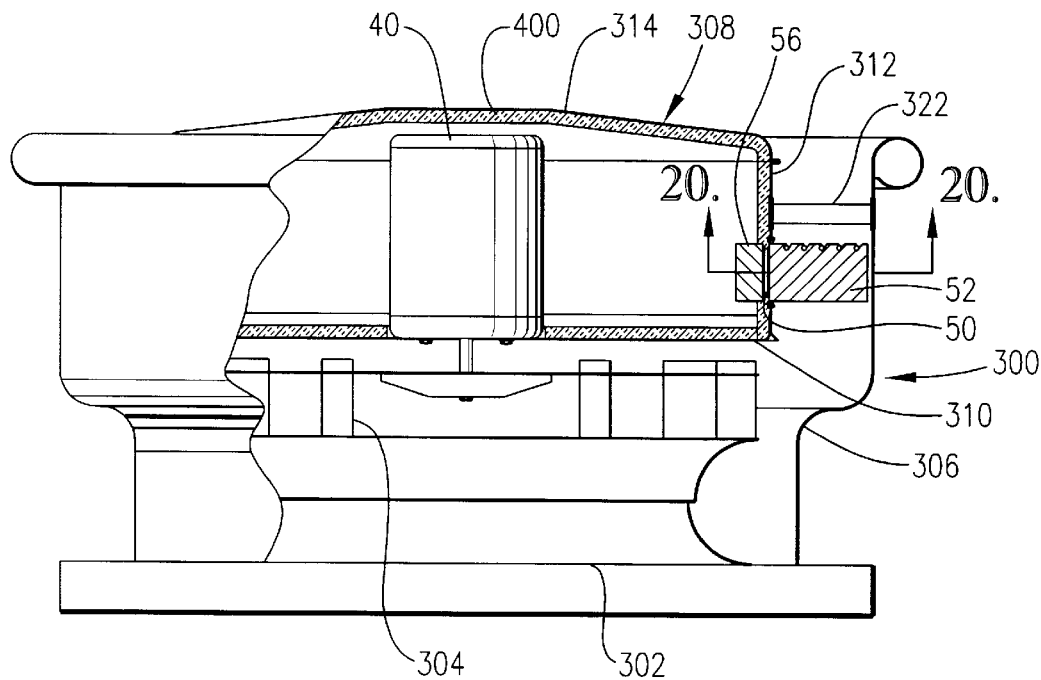
FIG. 19
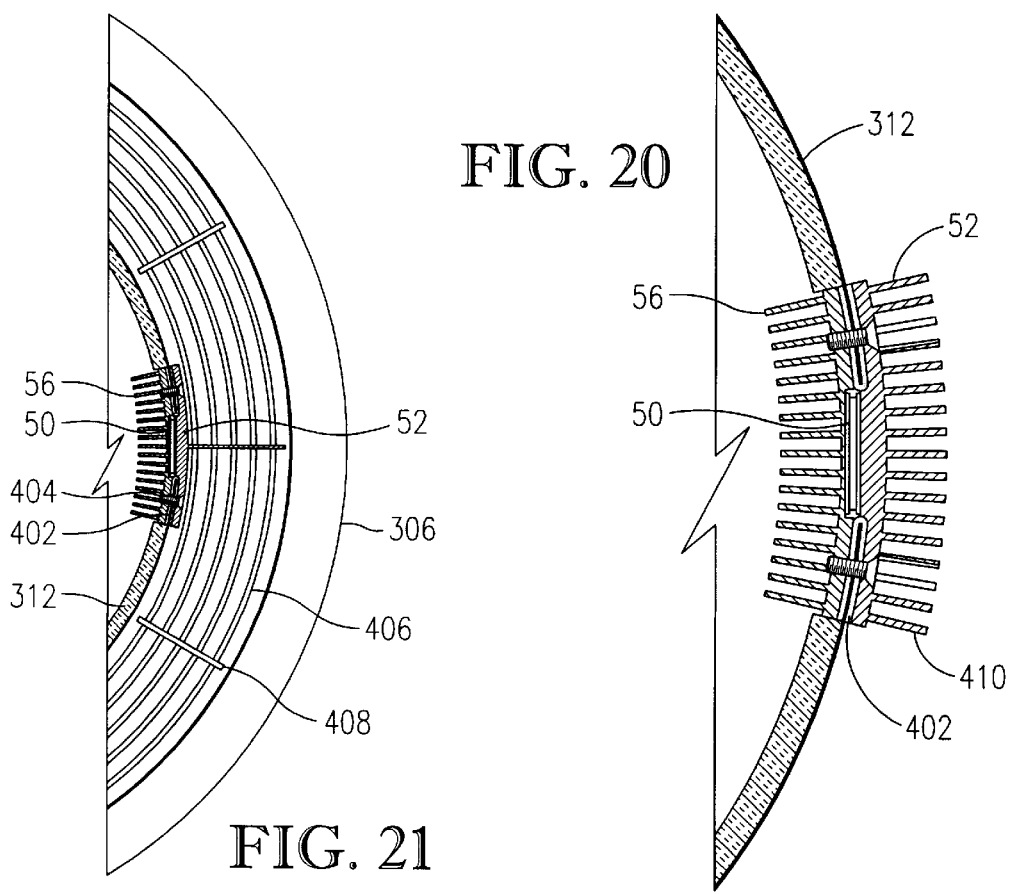
FIG. 20
FIG. 21

METHOD AND APPARATUS FOR COOLING AN ELECTRIC MOTOR

BACKGROUND OF THE INVENTION

The present invention relates generally to the cooling of electric motors. More particularly, the invention concerns a system employing a thermoelectric cooling device to cool electric motors.

DISCUSSION OF PRIOR ART

Designers of devices utilizing electric motors typically desire the lowest cost motor that will meet the requirements of the particular application. Balanced against the desire to utilize the motor having the lowest cost is the need to utilize a motor that maintains a safe operating temperature. Although larger motors, having a larger wire size or longer armature stacks, are less susceptible to overheating than smaller motors, larger motors are typically more expensive to purchase and operate.

In addition, the need to maintain a safe operating temperature is amplified when speed controllers are use in conjunction with electric motors. The use of speed controllers with electric motors can cause inefficiency and a disproportionate rise in motor operating temperature when the motor speed is adjusted.

In an effort to utilize smaller and less expensive electric motors, designers have attempted to cool the smaller motors during operation to prevent overheating. However, the prior art attempts in achieving this cooling have met with only limited success.

One conventional prior art solution to the electric motor overheating problem utilizes induced ambient air flow, wherein air is induced to flow over and/or within the motor shell. Small cooling fans attached directly to the motor shaft have been used to provide such induced air flow. Another conventional prior art solution utilizes cooling fins which are added to the motor shell to increase heat transfer to the induced ambient air. The use of induced ambient air flow to cool electric motors presents a number of drawbacks and disadvantages.

One of the problems experienced in using induced ambient air flow as a cooling mechanism relates to the fact that many electric motors are used in dirty or wet environments. For example, electric motors are used to provide power to roof ventilators. Where power roof ventilators are used for commercial kitchen applications, the environment is particularly poor for the motor due to the hot, grease-entrained kitchen air exhausted by the ventilator. In these environments, it is necessary to enclose the motor to protect the internal components of the motor from the external environment by means of a separate housing. Enclosing the motor in a housing, however, restricts the cooling achievable through induced ambient air flow. Therefore, even in the housing, prior art devices have found it necessary to circulate a stream of cooling air across or within the motor shell in order to maintain a safe working temperature for the motor. This cooling air is typically drawn through an inlet conduit from outside the housing to inside the housing. There are also provided outlet holes in the housing through which an air circulation pattern is induced. For power roof ventilators, the use of this induced ambient air compromises the cleanliness of the motor by recirculating air which is near the exhaust environment of the fan. The hot, grease-entrained air that is exhausted from the kitchen can surround the motor shell and sometimes is pulled into the motor interior, causing further inefficiencies or destruction of the motor. Cooling efforts may be further limited by a layer of congealed grease surrounding the motor.

OBJECTS AND SUMMARY OF THE INVENTION

It is an object of the present invention to provide a system that provides more effective cooling of electric motors than induced air flow technologies. It is another object of the invention to provide an electric motor cooling system that does not rely on induced ambient air flow for its cooling mechanism. It is yet another object of the invention to provide an electric motor cooling system that provides sufficient cooling to a completely enclosed motor so as to prevent overheating of the motor. It is still a further object of the invention to provide an electric motor cooling system that provides sufficient cooling such that a speed controlled motor can be used in an application without overheating.

In accordance with these and other objects evident from the following description of the preferred embodiments, the present invention concerns an apparatus for cooling the internal components of an electric motor. The apparatus comprises an enclosure for protecting the internal components from an external environment and a thermoelectric cooling device adapted to cool the interior of the enclosure.

The invention also concerns a method of cooling the internal components of an electric motor having an enclosure which defines an enclosure interior and protects the internal components from an external environment. The method includes the step of delivering an electric current to a thermoelectric cooling device which is disposed between the motor interior and the external environment thereby transferring heat from the motor interior to the external environment.

Other aspects and advantages of the present invention will be apparent from the following detailed description of the preferred embodiment and the accompanying drawings figures.

BRIEF DESCRIPTION OF THE DRAWINGS

A preferred embodiment of the invention is described in detail below with reference to the attached drawing figures, wherein:

FIG. 1 is a vertical cross-sectional view of a power roof ventilator having a ventilation fan assembly disposed therein;

FIG. 2 is a side elevation of a ventilation fan assembly, with parts being broken away to show particular details of construction;

FIG. 3 is a perspective view of a thermoelectric cooling device used in the present invention;

FIG. 4 is a schematic view demonstrating the operation of the thermoelectric cooling device of FIG. 3;

FIG. 5 is a side elevation view of a motor and fan arrangement according to the principles of the present invention;

FIG. 6 is an enlarged view of the encircled region 6 of FIG. 5 showing the interface between the motor, cold sink and heat sink;

FIG. 10 is a top plan view of a motor according to the principles of the present invention;

FIG. 11 is a side elevation view of the motor of FIG. 10, with parts being broken away to show particular details of construction;

FIG. 12 is an enlarged view of the encircled region 12 of FIG. 11;

FIG. 13 is a front elevation view of the motor of FIG. 10, with parts being broken away to show particular details of construction;

FIG. 14 is an enlarged view of the encircled region 14 of FIG. 13;

FIG. 19 is a front elevation view of a ventilator motor compartment according to the principles of another embodiment of the present invention, with parts being broken away to show particular details of construction;

FIG. 20 is an enlarged, partial cross-sectional view, taken along line 20—20 of FIG. 19; and FIG. 21 is a view similar to FIG. 20, showing an alternate construction.

DETAILED DESCRIPTION OF THE PREFERRED EMBODIMENT

Figure 7:
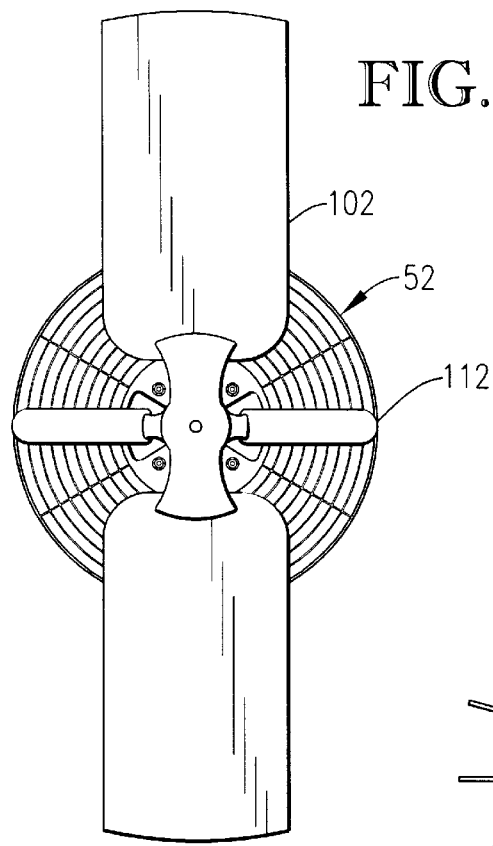
FIG. 7 is a front elevation view of the motor and fan arrangement of FIG. 5.

The present invention employs a thermoelectric cooling device to cool an enclosure containing the internal components of an electric motor. Although the following detailed description primarily discusses the use of the present invention in ventilation applications, any use of a thermoelectric cooling device to cool an electric motor is contemplated by the present invention. The present invention is particularly useful in a variety of applications where it is undesirable for the interior of the electric motor to be exposed to the external environment. For example, the present invention is useful for cooling electric motors operating in hot, wet, and/or dirty environments.

As shown in FIG. 1, in one embodiment, the present invention is particularly useful for ventilation applications. FIG. 1 illustrates a ventilation fan assembly 30 operable to displace a quantity of ventilated air 32 from a ventilated space 34 to a destination space 36 via a ventilation shaft 38. Ventilated space 34 is typically a room within a building, preferably a commercial kitchen. Ventilated air 32 may contain a quantity of contaminates such as, for example, grease, water and/or smoke, whose presence in ventilated space 34 is undesirable. Ventilated air 32 may also be of a temperature, typically an elevated temperature, which is undesirable within ventilated space 34. Most typically, ventilated air 34 is hot, moist, grease-entrained air produced in a commercial kitchen.

As shown in FIG. 2, ventilation fan assembly 30 comprises an electric motor 40 which is connected to fan blades 42 by a drive shaft 44. An enclosure 46 surrounds motor 40 and protects motor interior 48 from ventilated air 32. The internal components of an electric motor, such as, for example, a stator and a rotor (not shown) are disposed within motor interior 48.

Enclosure 46 can be the actual motor shell which defines motor interior 48, as further described below and best illustrated in FIGS. 5, 6 and 10–14. Alternatively, enclosure 46 can be a housing, separate from the motor shell, as further described below and best illustrated in FIGS. 15, 16 and 19–21.

Although enclosure 46 has the advantage of protecting motor interior 48 from contaminates which can be entrained in ventilated air 32, enclosure 46 also has the disadvantage of isolating motor interior 48 from the cooling effects of ventilated air 32.

The present invention employs at least one thermoelectric cooling device 50 to facilitate the transfer of heat from motor interior 48 to ventilated air 32. Thermoelectric cooling device 50 is preferably in thermal communication with a heat sink 52. Heat sink 52 is preferably located outside enclosure 46 and provides thermal communication with ventilated air 32. Thermoelectric cooling device 50 is preferably in thermal communication with a cold sink 56. Cold sink 56 is preferably located inside enclosure 46 and provides direct or indirect thermal communication with motor interior 48. Thermoelectric cooling device 50A can be disposed outside enclosure 46, as further described below and best illustrated in FIGS. 3, 4 and 15–18. Alternatively, thermoelectric cooling device 50B can be disposed inside enclosure 46. Alternatively, thermoelectric cooling device 50C can be disposed within an aperture in enclosure 46, as further described below and best illustrated in FIGS. 10–12 and 19–21.

Standard thermal sensors, not shown, may be included within enclosure 46. These thermal sensors can be used in conjunction with standard switching controls to control the operation of thermoelectric cooling device 50 to maintain the desired temperature inside enclosure 46. In other words, when the temperature within enclosure 46 reaches a preset upper limit, the thermal sensors inform the switching controls to supply current to thermoelectric cooling device 50. Current will continue to be supplied to thermoelectric device 50 until the thermal sensors indicate that the temperature within enclosure 46 has dropped below a preset lower limit.

As shown in FIG. 3, thermoelectric cooling device 50 is preferably a commercially available, solid-state semiconductor heat pumping device. Thermoelectric cooling device 50 comprises a semiconductor 51 and a pair of conductors 54. Semiconductor 51 comprises a material which is capable of producing a Peltier effect such as, for example, bismuth telluride. Semiconductor 51 is disposed between and electrically coupled to a pair of conductors 54. Conductors 54 comprise an electrically conductive material such as, for example, copper.

As shown in FIG. 4, heat sink 52 can be coupled to one of the conductors 54 and cold sink 56 can be coupled to the other of the conductors 54. In operation, a direct current is applied to thermoelectric cooling device 50 by a power supply 58. The current flow is represented by the letter I and flows in the direction of the arrow in FIG. 4. With the application of direct current to thermoelectric cooling device 50, heat absorbed at the cold sink 56, and represented by the letter Q, is pumped to the heat sink 52 at a rate proportional to the current passing through thermoelectric cooling device 50.

Referring now to FIGS. 5 and 6, in an embodiment of the present invention, a cooling assembly 100 is used to cool electric motor 40, shown as driving fan blades 102. Motor 40 has an exterior shell 104. As best seen in FIG. 6, in this embodiment, the cold sink 56 is connected directly to a face plate 66 of motor 40. Cold sink 56 may be attached to face plate 106 using any suitable attaching mechanism. For example, cold sink 56 may be attached with machine screws 108. As shown, cold sink 56 maybe a solid circular plate, but could also be shaped differently and could also be formed with fins or other extensions. Cold sink 56 is preferably formed from an aluminum extrusion process and cut to the necessary height to provide an adequate heat transfer.

Thermoelectric cooling device 50 is preferably disposed immediately adjacent cold sink 56 and is in direct contact therewith. At least one thermoelectric cooling device 50 is used, and in this embodiment two such devices 50 are preferably used. Heat sink 52 is located on the side of thermoelectric cooling device 50 opposite cold sink 56 and is also in direct contact with thermoelectric cooling device 50. The entire assembly of heat sink 52, thermoelectric cooling device 50 and cold sink 56 is attached to the face plate 106 using machine screws 108. Heat sink 52 can include a solid plate 110. Thermoelectric cooling device 50 is supplied with power from a remote power supply, which will typically be located in the primary electrical enclosure for the fan. When current is supplied to thermoelectric cooling device 50 from the power supply, excess heat within the motor 40 flows to the cold sink 56. Thermoelectric cooling device 50, with current flowing therethrough, pumps heat from cold sink 56 to heat sink 52. This heat is discharged from heat sink 52 to the atmosphere.

As shown in FIG. 7, an optional pair of cooling blades 112 are provided to augment the air flow across heat sink 52 and act to increase the rate of heat discharge from heat sink 52.

Figure 8:
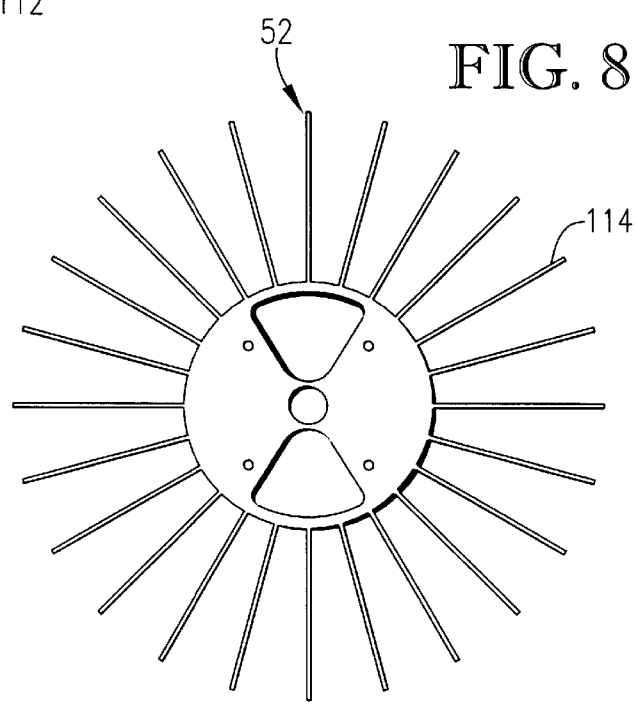
FIG. 8 is a view of an alternative heat sink configuration.
Figure 9:
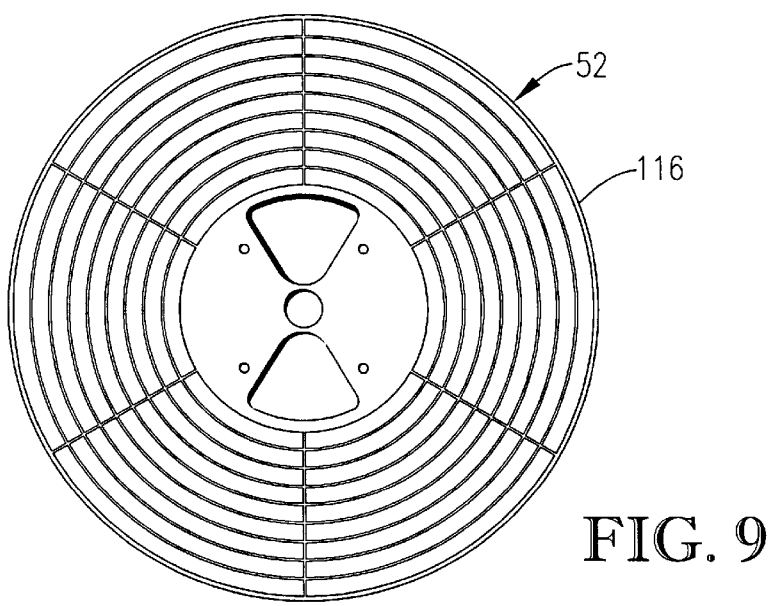
FIG. 9 is a view similar to FIG. 8 of another alternative heat sink configuration.

As shown in FIGS. 8 and 9, heat sink 52 can also include radial fins 114, as shown in FIG. 8, or concentric fins 116, as shown in FIG. 9. As with cold sink 56, heat sink 52 is preferably formed from an aluminum extrusion process and cut to the necessary height to provide an adequate heat transfer. The addition of fins 114 or 116 increases the heat transfer rate of heat sink 52. While several embodiments have been shown for heat sink 52, the invention is not limited to any particular shape or configuration, as many such shapes and configurations would be suitable and are within the scope of the invention.

As can be understood, thermoelectric cooling device 50 along with heat sink 52 and cold sink 56 operate to maintain a safe operating temperature for motor 40 while not requiring an induced air flow within enclosure 46.

Turning to FIGS. 10–14, an alternative embodiment for the present invention is illustrated. In this embodiment, electric motor 40 is not shown as coupled to a fan, as motor 40 could be used for any of a variety of purposes. Motor 40 is equipped with shell 104 as before. In this embodiment, shell 104 is formed with an opening 200 therein, as best seen in FIG. 14. Shell 104 has a layer of insulation 202 attached thereto and extending from the interior of shell 104, through opening 200, to the exterior of shell 104. As best seen in FIGS. 12 and 14, cold sink 56 is located on the interior side of shell 104 and extends across opening 200. Cold sink 56 and insulation 202 operate to completely close opening 200, so that shell 104 is sealed. As in the previously described embodiment, cold sink 56 is preferably formed in an aluminum extrusion process, although other materials and methods of formation would also be suitable. In this embodiment, cold sink 56 is formed with a radius of curvature corresponding to that of shell 104. Cold sink 56 is also equipped with extending fins 204 to increase the heat transfer characteristics of cold sink 56. To hold the cooling assembly together, a plurality of threaded holes 206 are provided in cold sink 56, as shown in FIG. 12. A plurality of screws 208 are threaded into cold sink 56 to clamp the assembly in place on shell 104, as is more fully described below.

Thermoelectric cooling device 50 is disposed immediately adjacent cold sink 56 and is located generally within opening 200. As best seen in FIG. 12, a number of thermoelectric cooling devices 50 are used and are spaced along the length of shell 164. Each thermoelectric cooling device 50 is supplied with a direct current from a power supply located in a remote location away from motor 40.

Disposed immediately adjacent thermoelectric cooling devices 50 is heat sink 52. As best seen in FIG. 14, heat sink 52 is separated from shell 104 by insulation 202. Heat sink 52, in this embodiment, has a lower surface that is curved to correspond to the curvature of shell 104. As before, heat sink 52 is preferably made from an aluminum material and can be extruded into the desired shape and size. It should be understood that other shapes and materials could also be used. Like cold sink 56, heat sink 52 is equipped with a number of spaced fins 210 that operate to enhance the heat transfer abilities of heat sink 52. As best seen in FIG. 12, heat sink 52 has a number of spaced, countersunk holes 212 disposed therethrough.

To couple the cooling assembly to motor 40, cold sink 56 is placed within the interior of shell 104 over opening 200 and against insulation 202. The thermoelectric cooling devices 50 are located immediately above cold sink 56 and heat sink 52 is located above thermoelectric cooling devices 50. Screws 208 are placed through countersink holes 212 and are threaded into holes 206, clamping the entire assembly in place on shell 104.

In use, the thermoelectric cooling devices 50 are supplied with power from the remote power supply. When current is supplied to thermoelectric cooling devices 50 from the power supply, excess heat within the motor 40 flows to the cold sink 56. Thermoelectric cooling device 50, with current flowing therethrough, pumps this heat from cold sink 56 to heat sink 52. This heat is discharged from heat sink 52 to the atmosphere, with fins 210 facilitating this process.

Figure 15:
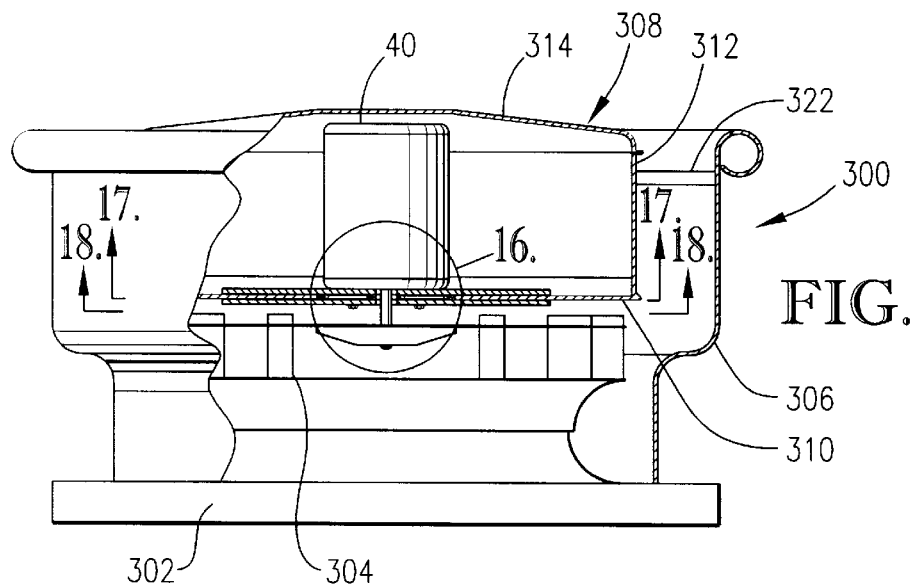
FIG. 15 is a front elevation view of a ventilator motor compartment according to the principles of the present invention, with parts being broken away to show particular details of construction.

Turning now to FIGS. 15–18, an alternate embodiment of the present invention is illustrated, demonstrating the use of the present invention in a ventilator fan 300. Fan 300 is typically used in a rooftop environment to exhaust the air from a room or building. For example, fan 300 may be used to exhaust the air from a commercial kitchen environment. Fan 300 has a base 302 that supports an impeller blade 304. Blade 304 is powered by electric motor 40. The entire assembly is typically surrounded by a perimeter member 306, as best seen in FIG. 15. In use, motor 40 provides power to the impeller blades 304 to draw air within the building upwardly and outwardly.

In these environments, it is often necessary to provide a housing 308 to protect motor 40 from the dirty and grease-laden surroundings. Housing 308 typically includes a base 310 upon which face plate 106 of motor 40 rests, along with a surrounding body 312 and an enclosing hood 314. The present invention allows motor 40 to be completely enclosed by housing 308 without the need for an induced air flow to ensure a safe operating temperature for motor 40.

Figure 16:
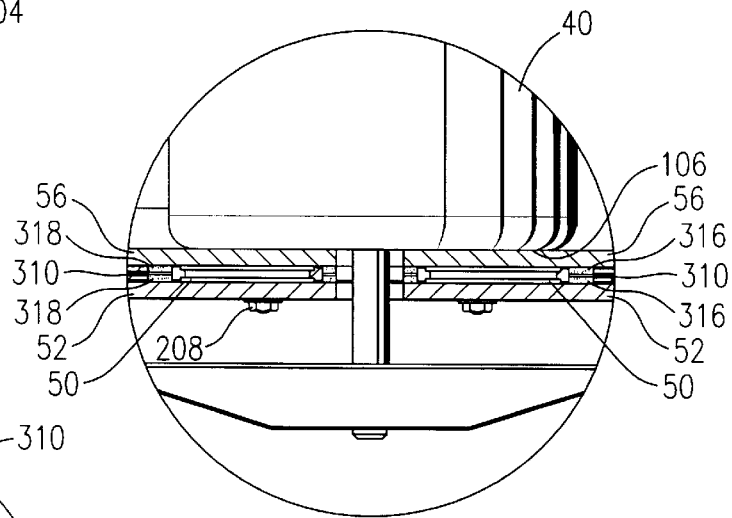
FIG. 16 is an enlarged view of the encircled region 16 of FIG. 15
Figure 17:
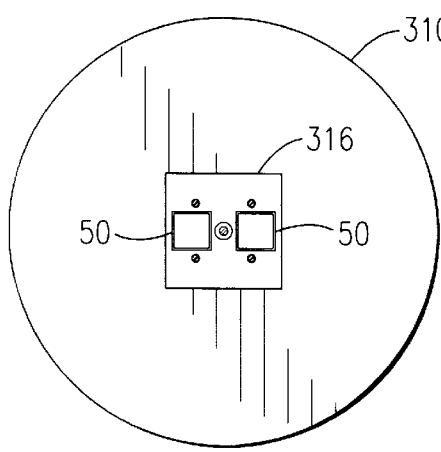
FIG. 17 is a partial cross-sectional view, taken along line 17—17 of FIG. 15.

As best seen in FIG. 16, in this embodiment, face plate 106 does not rest directly on base 310 as in the prior art. Instead, face plate 106 rests directly upon cold sink 56, which is formed and shaped as described above. Cold sink 56 is in direct contact with a first insulation layer 316, as well as a pair of thermoelectric cooling devices 50. Insulation 316 is coupled to base 310, as best seen in FIGS. 16 and 17, and operates to insulate base 310 from cold sink 56. A second insulation layer 318 is coupled to the opposite side of base 310, as seen in FIG. 16.

Figure 18:
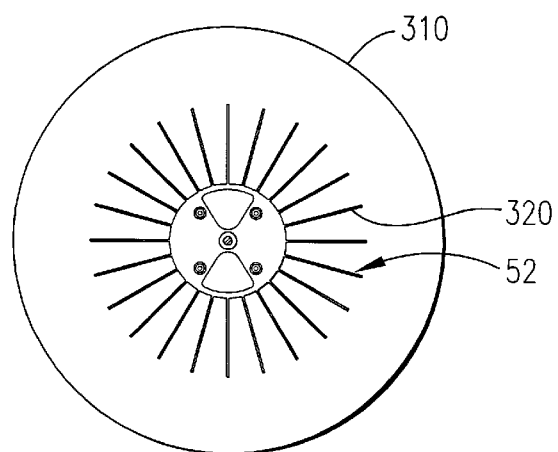
FIG. 18 is a partial cross-sectional view, taken along line 18—18 of FIG. 15.

Heat sink 52 is coupled to insulation layer 318 and to the side of cooling devices 50 opposite cold sink 56. Insulation 318 operates to insulate heat sink 52 from base 310. As best shown in FIG. 18, heat sink 52 can be equipped with radially extending fins 320. As with the previously described sinks, heat sink 52 is preferably formed from an extruded aluminum and cut to the desired height or thickness. It should be understood, however, that other shapes and forming methods could be used.

Heat sink 52, thermoelectric cooling devices 50 and cold sink 56 are held in place using any suitable attaching mechanism. As shown, the entire assembly can be held in place with four machine screws 208 that are threaded directly into face plate 106.

The electrical wiring for motor 40 and cooling devices 50 is passed through an electrical conduit 322 that extends through perimeter member 306 into housing 308. Conduit 322 provides an avenue for the wiring while maintaining the enclosed environment for housing 308. Thermoelectric cooling device 50 is supplied with power from a remote power supply, which will typically be located in the primary electrical enclosure for fan 300. When current is supplied to thermoelectric cooling device 50 from the power supply, excess heat within motor 40 flows to cold sink 56. Thermoelectric cooling device 50, with current flowing therethrough, pumps this heat from cold sink 56 to heat sink 52. This heat is discharged from heat sink 54 to the atmosphere. In this manner, the invention operates to maintain a safe operating temperature within housing 308, even though housing 308 is not provided with induced ambient air flow.

As with previous embodiments, standard thermal sensors maybe included within housing 308. These thermal sensors are used in conjunction with standard switching controls to control the operation of thermoelectric cooling device 50 to maintain the desired temperature inside housing 308. In other words, when the temperature within housing 308 reaches a preset upper limit, the thermal sensors will inform the switching controls to supply current to cooling device 50. Current will continue to be supplied to thermoelectric cooling device 50 until the thermal sensors indicate that the temperature within housing 308 has dropped below a preset lower limit. As can be understood, thermoelectric cooling device 50 along with heat sink 52 and cold sink 56 operate to maintain a safe operating temperature for motor 40 while not requiring an induced air flow within housing 308. This is particularly advantageous in the environment for ventilator fan 300, as it is not necessary to induce the hot, grease-entrained air across the motor in order to maintain a safe operating temperature within housing 308.

Turning now to FIGS. 19–21, an alternative embodiment of the present invention is using a ventilator fan 300, similar to the previously described embodiment. However, in this embodiment, the cooling assembly is not placed in direct contact with the motor 40. Instead, motor 40 is mounted in direct contact with base 310 of housing 308, as in the prior art. A layer of insulation 400 is preferably coupled about the interior of housing 308. In this embodiment, however, body 312 of housing 308 has mounted thereto a cold sink 56, a thermoelectric cooling device 50 and a heat sink 52. As can best be seen in FIG. 20, cold sink 56 is located in the interior of housing 308, and is separated from body 312 by a layer of insulation 402. Similarly, heat sink 52 is located on the exterior of housing 308 and is separated from body 312 by insulation 402. A number of machine screws 404 may be used to couple the above-assembly to body 312.

As best shown in FIG. 21, cold sink 56 is preferably formed from an extruded material and may be equipped with fins to further aid in heat transfer, as described with regard to the earlier embodiments of this invention. Heat sink 52 is similarly extruded, and as shown in FIG. 21, may be formed to hold a series of bird-guard wires 406. Wires 406 act to prevent a bird or other animal from gaining access to the fan impeller 304. Wires 406 may be connected with radial cross wires 408 to form a unitized guard. The assembly of wires 406 and 408 are mechanically attached to heat sink 52 by a press-fit into angular oriented holes formed within sink 52. It should be understood that other methods of attachment could be used. This press-fit attachment achieves a thermal connection between wires 406 to heat sink 52, thus adding radiant surface area to dissipate heat. Typically, a plurality of heat sinks 52 will be used to support the wires 406 and to more evenly distribute the heat to wires 406. As shown, heat sink 52 in this embodiment does not have fins associated therewith. It should be understood, however, that fins could be added to add heat transfer capacity as needed.

In another alternate embodiment, as shown in FIG. 20, the cold sink 56 and thermoelectric cooling device 50 are located and held in place as described above with respect to FIGS. 19 and 21. In this embodiment, however, wires 406 and 408 are not used. Instead, heat sink 52 is formed with a plurality of fins 410. Again, heat sink 52, cold sink 56 and thermoelectric cooling device 50 work as described with the embodiments described above, such that when electrical current is supplied to thermoelectric cooling device 50, it operates in conjunction with cold sink 56 and heat sink 52 to cool the interior of housing 308.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereto it is to be understood that all matter herein set forth or shown in the accompanying drawings is to be interpreted as illustrative and not in a limiting sense.

What is claimed is:

1. An apparatus for cooling internal components of an electric motor, said apparatus comprising:
   an enclosure defining an enclosure interior, said internal components located in the enclosure interior, said enclosure adapted to protect the internal components from an external environment located outside the enclosure; and
   a thermoelectric cooling device directly contacting the enclosure and adapted to cool the enclosure interior.

2. The apparatus as claimed in claim 1,
   said thermoelectric cooling device operable to transfer heat from the enclosure interior to the external environment, thereby cooling the enclosure interior.

3. The apparatus as claimed in claim 1; and
   a heat sink providing thermal communication between the thermoelectric cooling device and the external environment.

4. The apparatus as claimed in claim 3; and
a cold sink providing thermal communication between the enclosure interior and the thermoelectric cooling device.

5. The apparatus as claimed in claim 4,
said thermoelectric cooling device disposed between and in direct contact with the heat sink and the cold sink, said thermoelectric cooling device operable to transfer heat from the cold sink to the heat sink.

6. The apparatus as claimed in claim 5,
said thermoelectric cooling device disposed outside the enclosure.

7. An apparatus for cooling internal components of an electric motor, said apparatus comprising:
an enclosure defining an enclosure interior, said internal components located in the enclosure interior, said enclosure adapted to protect the internal components from an external environment located outside the enclosure;
a thermoelectric cooling device adapted to cool the enclosure interior;
a heat sink providing thermal communication between the thermoelectric cooling device and the external environment; and
a cold sink providing thermal communication between the enclosure interior and the thermoelectric cooling device, p1 said thermoelectric cooling device disposed between and in direct contact with the heat sink and the cold sink, said thermoelectric cooling device operable to transfer heat from the cold sink to the heat sink,
said thermoelectric cooling device disposed inside the enclosure.

8. An apparatus for cooling internal components of an electric motor, said apparatus comprising:
an enclosure defining an enclosure interior, said internal components located in the enclosure interior, said enclosure adapted to protect the internal components from an external environment located outside the enclosure;
a thermoelectric cooling device adapted to cool the enclosure interior;
a heat sink providing thermal communication between the thermoelectric cooling device and the external environment; and
a cold sink providing thermal communication between the enclosure interior and the thermoelectric cooling device,
said thermoelectric cooling device disposed between and in direct contact with the heat sink and the cold sink, said thermoelectric cooling device operable to transfer heat from the cold sink to the heat sink,
said thermoelectric cooling device disposed within an aperture in the enclosure.

9. The apparatus as claimed in claim 5,
said enclosure have a shaft-receiving aperture therein for allowing a drive shaft of the electric motor to extend therethrough.

10. The apparatus as claimed in claim 5,
said enclosure being a motor shell.

11. The apparatus as claimed in claim 5; and
a motor shell defining a motor interior, said motor shell located in the enclosure interior, said internal components located in the motor interior.

12. An apparatus comprising:
an electric motor having a motor shell defining a motor interior, said motor shell adapted to protect the motor interior from a motor exterior located outside the motor shell; and
a thermoelectric cooling device directly contacting the motor shell and operable to transfer heat from the motor interior to the motor exterior.

13. The apparatus as claimed in claim 12; and
a heat sink for providing thermal communication between the thermoelectric cooling device and the motor exterior.

14. The apparatus as claimed in claim 13; and
a cold sink for providing thermal communication between the motor interior and the thermoelectric cooling device.

15. The apparatus as claimed in claim 14,
said thermoelectric cooling device disposed between and in direct contact with the heat sink and the cold sink, said thermoelectric cooling device operable to transfer heat from the cold sink to the heat sink, thereby cooling the motor interior.

16. The apparatus as claimed in claim 15,
said thermoelectric cooling device disposed outside the motor shell.

17. An apparatus comprising:
an electric motor;
a thermoelectric cooling device adapted to cool the electric motor;
said electric motor having a motor shell defining a motor interior, said motor shell adapted to protect the motor interior from a motor exterior located outside the motor shell;
a heat sink for providing thermal communication between the thermoelectric cooling device and the motor exterior; and
a cold sink for providing thermal communication between the motor interior and the thermoelectric cooling device,
said thermoelectric cooling device disposed between and in direct contact with the heat sink and the cold sink, said thermoelectric cooling device operable to transfer heat from the cold sink to the heat sink, thereby cooling the motor interior,
said thermoelectric cooling device disposed inside the motor shell.

18. An apparatus comprising:
an electric motor;
a thermoelectric cooling device adapted to cool the electric motor;
said electric motor having a motor shell defining a motor interior, said motor shell adapted to protect the motor interior from a motor exterior located outside the motor shell;
a heat sink for providing thermal communication between the thermoelectric cooling device and the motor exterior; and
a cold sink for providing thermal communication between the motor interior and the thermoelectric cooling device,
said thermoelectric cooling device disposed between and in direct contact with the heat sink and the cold sink, said thermoelectric cooling device operable to transfer heat from the cold sink to the heat sink, thereby cooling the motor interior, said thermoelectric cooling device disposed within an aperture in the motor shell.

19. An apparatus comprising:

an enclosure defining an enclosure interior, said enclosure adapted to protect the enclosure interior from an external environment located outside the enclosure;

internal components of an electric motor located in the enclosure interior; and a thermoelectric cooling device directly contacting the enclosure and adapted to transfer heat from the enclosure interior to the external environment, thereby cooling the enclosure interior.

20. The apparatus as claimed in claim 19; and a motor shell defining a motor interior, said motor shell located in the enclosure interior, said internal components located in the motor interior.

21. The apparatus as claimed in claim 20; and a cold sink providing thermal communication between the enclosure interior and the thermoelectric cooling device, and a heat sink providing thermal communication between the thermoelectric cooling device and the external environment.

22. The apparatus as claimed in claim 21;

said thermoelectric cooling device disposed between and in direct contact with the heat sink and cold sink, said thermoelectric cooling device operable to transfer heat from the cold sink to the heat sink, thereby cooling the enclosure interior.

23. The apparatus as claimed in claim 22, said thermoelectric cooling device disposed outside the enclosure.

24. An apparatus comprising:

an enclosure defining an enclosure interior, said enclosure adapted to protect the enclosure interior from an external environment located outside the enclosure;

internal components of an electric motor located in the enclosure interior;

a thermoelectric cooling device adapted to transfer heat from the enclosure interior to the external environment, thereby cooling the enclosure interior;

a motor shell defining a motor interior, said motor shell located in the enclosure interior, said internal components located in the motor interior;

a cold sink providing thermal communication between the enclosure interior and the thermoelectric cooling device; and a heat sink providing thermal communication between the thermoelectric cooling device and the external environment, said thermoelectric cooling device disposed between and in direct contact with the heat sink and cold sink, said thermoelectric cooling device operable to transfer heat from the cold sink to the heat sink, thereby cooling the enclosure interior, said thermoelectric cooling device disposed inside the enclosure.

25. An apparatus comprising:

an enclosure defining an enclosure interior, said enclosure adapted to protect the enclosure interior from an external environment located outside the enclosure;

internal components of an electric motor located in the enclosure interior;

a thermoelectric cooling device adapted to transfer heat from the enclosure interior to the external environment, thereby cooling the enclosure interior;

a motor shell defining a motor interior, said motor shell located in the enclosure interior, said internal components located in the motor interior;

a cold sink providing thermal communication between the enclosure interior and the thermoelectric cooling device; and a heat sink providing thermal communication between the thermoelectric cooling device and the external environment, said thermoelectric cooling device disposed between and in direct contact with the heat sink and cold sink, said thermoelectric cooling device operable to transfer heat from the cold sink to the heat sink, thereby cooling the enclosure interior, said thermoelectric cooling device disposed within an aperture in the enclosure.

26. The apparatus as claimed in claim 19, said enclosure being a motor shell defining a motor interior.

27. The apparatus as claimed in claim 26; and a cold sink providing thermal communication between the motor interior and the thermoelectric device, and a heat sink providing thermal communication between the thermoelectric cooling device and the external environment.

28. The apparatus as claimed in claim 27, said thermoelectric cooling device disposed between and in direct contact with the cold sink and the heat sink, said thermoelectric cooling device operable to transfer heat from the cold sink to the heat sink, thereby cooling the motor interior.

29. The apparatus as claimed in claim 28, said thermoelectric cooling device disposed outside the motor shell.

30. An apparatus comprising:

an enclosure defining an enclosure interior, said enclosure adapted to protect the enclosure interior from an external environment located outside the enclosure;

internal components of an electric motor located in the enclosure interior;

a thermoelectric cooling device adapted to transfer heat from the enclosure interior to the external environment, thereby cooling the enclosure interior, said enclosure being a motor shell defining a motor interior;

a cold sink providing thermal communication between the motor interior and the thermoelectric device; and a heat sink providing thermal communication between the thermoelectric cooling device and the external environment, said thermoelectric cooling device disposed between and in direct contact with the cold sink and the heat sink, said thermoelectric cooling device operable to transfer heat from the cold sink to the heat sink, thereby cooling the motor interior, said thermoelectric cooling device disposed inside the motor shell.

31. An apparatus comprising:

an enclosure defining an enclosure interior, said enclosure adapted to protect the enclosure interior from an external environment located outside the enclosure;

internal components of an electric motor located in the enclosure interior;

a thermoelectric cooling device adapted to transfer heat from the enclosure interior to the external environment, thereby cooling the enclosure interior, said enclosure being a motor shell defining a motor interior;

a cold sink providing thermal communication between the motor interior and the thermoelectric device; and a heat sink providing thermal communication between the thermoelectric cooling device and the external environment, said thermoelectric cooling device disposed between and in direct contact with the cold sink and the heat sink, said thermoelectric cooling device operable to transfer heat from the cold sink to the heat sink, thereby cooling the motor interior, said thermoelectric cooling device disposed within an aperture in the motor shell.

32. A method of cooling internal components of an electric motor, said internal components located in an enclosure interior defined by an enclosure, said enclosure adapted to protect the internal components from an external environment, said method comprising the step of:

(a) delivering an electric current to a thermoelectric cooling device disposed between the enclosure interior and the external environment, thereby transferring heat from the enclosure interior to the external environment.

33. The method as claimed in claim 32;

(b) positioning a cold sink in thermal communication with the enclosure interior; and (c) thermally coupling said thermoelectric cooling device to said cold sink.

34. The method as claimed in claim 33; and (d) positioning a heat sink in thermal communication with the external environment; and (e) thermally coupling said thermoelectric cooling device to said heat sink.

35. The method as claimed in claim 34, said enclosure being a motor shell.

36. The method as claimed in claim 34, a motor shell defining a motor interior is located in the enclosure interior and the internal components are located in the motor interior.

37. The method as claimed in claim 34; and (f) measuring an enclosure interior temperature inside the enclosure.

38. The method as claimed in claim 37, step (a) commencing when the enclosure interior temperature is greater than a preset upper temperature limit.

39. The method as claimed in claim 38, step (a) terminating when the enclosure interior temperature is less than a preset lower temperature limit.

* * * * *